United States Patent
Sanders et al.

(10) Patent No.: US 6,560,595 B1
(45) Date of Patent: May 6, 2003

(54) OPERATOR FOR CORRELATED PREDICATES IN A QUERY

(75) Inventors: Daniel S. Sanders, Orem, UT (US); Scott W. Pathakis, Sandy, UT (US); James R. Davis, III, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/440,482

(22) Filed: Nov. 15, 1999

(51) Int. Cl.[7] .............................................. G06F 17/30
(52) U.S. Cl. ............................. 707/2; 707/3; 707/100; 707/103 R
(58) Field of Search ........................ 707/2, 3, 4, 103, 707/100, 101, 103 R, 103 Y

(56) References Cited

U.S. PATENT DOCUMENTS

| | | | | |
|---|---|---|---|---|
| 5,367,675 A | * | 11/1994 | Cheng et al. ................... | 707/4 |
| 5,548,755 A | * | 8/1996 | Leung et al. ................... | 707/2 |
| 5,551,031 A | * | 8/1996 | Cheng et al. ................... | 707/2 |
| 5,557,791 A | * | 9/1996 | Cheng et al. ................... | 707/2 |
| 5,761,657 A | * | 6/1998 | Hoang ............................ | 707/2 |
| 5,822,750 A | * | 10/1998 | Jou et al. ........................ | 707/2 |
| 5,870,739 A | * | 2/1999 | Davis, III et al. ............... | 707/4 |
| 5,873,079 A | * | 2/1999 | Davis, III et al. ............... | 707/3 |
| 5,884,304 A | * | 3/1999 | Davis, III et al. ............... | 707/4 |
| 5,905,982 A | * | 5/1999 | Carey et al. .................... | 707/2 |
| 6,112,198 A | * | 8/2000 | Lohman et al. ................. | 707/3 |
| 6,167,393 A | * | 12/2000 | Davis, III et al. ............... | 707/3 |
| 6,341,281 B1 | * | 1/2002 | MacNicol et al. .............. | 707/2 |

OTHER PUBLICATIONS

Gray et al. "Data Cube: A Relational Aggregation Operator Genelizing Group-By, Cross-Tab, and Sub-Totals" Microsoft Technical Report, Feb. 1995, Revised Nov. 1995.*

Rao et al., "Reusing Invariants: A New Strategy for Correlated Queries" ACM SIGMOD Record, Proceedings of ACM SIGMOD international conference on Management of data Jun. 1998, pp. 37–48.*

Lin et al., "Processing OODB Queries by O–Algebra" Proceedings of the fifth international conference on Information and knowledge management Nov. 1996, pp. 134–142.*

Kifer et al., Querying Object–Oriented Database, ACM SIGMOD Jun. 1992, pp. 393–402.*

Jin, Beihong, "Translating object query language", IEEE, Technology of Object–Oriented Languages and Systems, TOOLS 31. Proceedings, Sep. 22–25, 1999, pp.:380–385.*

* cited by examiner

Primary Examiner—John Breene
Assistant Examiner—Khanh Pham
(74) Attorney, Agent, or Firm—Marger Johnson & McCollom, P.C.

(57) ABSTRACT

A correlation operator Θ provides a way for the results of sub-queries to be correlated. The correlation operator Θ has an implied existential quantifier property (i.e., a "for some" property) and is satisfied if any record matches its sub-query. If no record is found that matches the correlation operator Θ's sub-query, then the correlation operator Θ query fails. The implicit existential quantifier property of the correlation operator Θ can be converted into a universal quantifier property (i.e., a "for all" property) by transformation of the query.

The correlation operator Θ uses an algebra to resolve into flags attached to appropriate operators in the sub-query. After the correlation operator Θ is eliminated from the query, the query can be performed. The operator flags perform the correlation as part of the sub-query.

The correlation operator Θ can be inserted explicitly by the user if she knows what data she desires to be correlated. Alternatively, the correlation operator can be inserted by the schema automatically to improve the expected results of the query.

48 Claims, 10 Drawing Sheets

OPERATOR FOR CORRELATED PREDICATES IN A QUERY

FIELD OF THE INVENTION

This invention relates to databases and more particularly, to using a correlation operator Θ to correlate sub-queries.

BACKGROUND OF THE INVENTION

Database methodologies, developing for decades, now include relational, object-oriented, and heterogeneous types. Heterogeneous databases have arbitrarily structured records.

This application is commonly assigned with U.S. patent application Ser. No. 6,167,393 to Davis, III et al.

Ubiquitous personal computing, collaborative group computing, and highly integrated, distributed environments create new demands on databases. Databases store information, that is most useful when retrieved completely, reliably, and quickly.

Records (or combinations of records) in a database generally represent an object in the real world (a product, a customer, an employee, a business division, etc.). As such, a record typically consists of a collection of fields that represent attributes of the object. This collection of fields is not necessarily "complete," but has been deemed sufficiently useful to describe the object and distinguish it from any other object represented in the database. Ultimately, the contents of these fields are the information that distinguish one object from another.

By way of example, traditionally, databases use schema to define record "types" or object classes. In such databases, a record type (or object class) is an abstraction or generalization about the collection of records in the database that represents the same "kind" of real world object. As such, a record "type" may be thought of as "meta-data," or "data about data." A record type typically defines certain relevant attributes and/or behaviors that are to be found in instances of that record type. For example, the record type "person" may specify that a "person" record contains attributes of height, weight, hair color, phone number, etc. The set of "person" records in the database is homogeneous in that each record contains exactly the same set of attributes (those that are defined in the "person" record type).

As an alternative to relational database structures, arbitrarily structured records can be used. In an arbitrarily structured record, repeating fields, missing fields, null-valued fields, and sub-record entities may exist. A database containing arbitrarily structured records presents numerous difficulties for a query engine designed to locate records within the database. An arbitrarily structured record might also include more than a single field having the same field identification or field name.

Internal self-description exists within arbitrarily structured records since no over-riding schema need exist, as compared with relational databases. Thus, data may not always be cleanly divided into homogenous tables, each having a single schema (record template), as required by the relational database model.

For example, a business organization may have some substantial structuring. Nevertheless, an address book might regard every company entity (e.g., company, division, department, unit, individual, etc.) as a contact, customer, client, or the like. Such a universal address book may need to accommodate all entities possessing an address and a phone number regardless of other attributes.

In searching a database, whether the database is relational, object-oriented, arbitrarily structured, or of some other type, data may need to be correlated. It may be necessary to identify a record in the database for which two properties exist, or two records that share a common property. For example, in searching a database of vehicles and their owners, a user may need to identify all owners who own a particular vehicle combination of make, model, color, year, etc. Or a user may need to identify all owners who own a particular combination of vehicles. A database can be manually correlated, but the process is cumbersome, requiring a high degree of skill from the user. Any user lacking the needed skill would be unable to complete the desired search.

SUMMARY OF THE INVENTION

A correlation operator Θ requires that the results of the sub-queries it has for an operand be correlated. The correlation operator Θ has an implied existential quantifier property (i.e., a "for some" property) and is satisfied if any record matches its sub-query. If no record is found that matches the correlation operator Θ's sub-query, then the correlation operator Θ query fails. The implicit existential quantifier property of the correlation operator Θ can be converted into a universal quantifier property (i.e., a "for all" property) by transformation of the query.

The invention further includes an algebra for resolving the correlation operator Θ into flags attached to appropriate operators in the sub-query. After the correlation operator Θ is eliminated from the query, the query can be performed.

The correlation operator Θ can be inserted explicitly by the user if she knows what data she desires to be correlated. Alternatively, the correlation operator can be inserted by the schema automatically to improve the expected results of the query.

DETAILED DESCRIPTION OF THE PREFERRED EMBODIMENT

Figure 1:
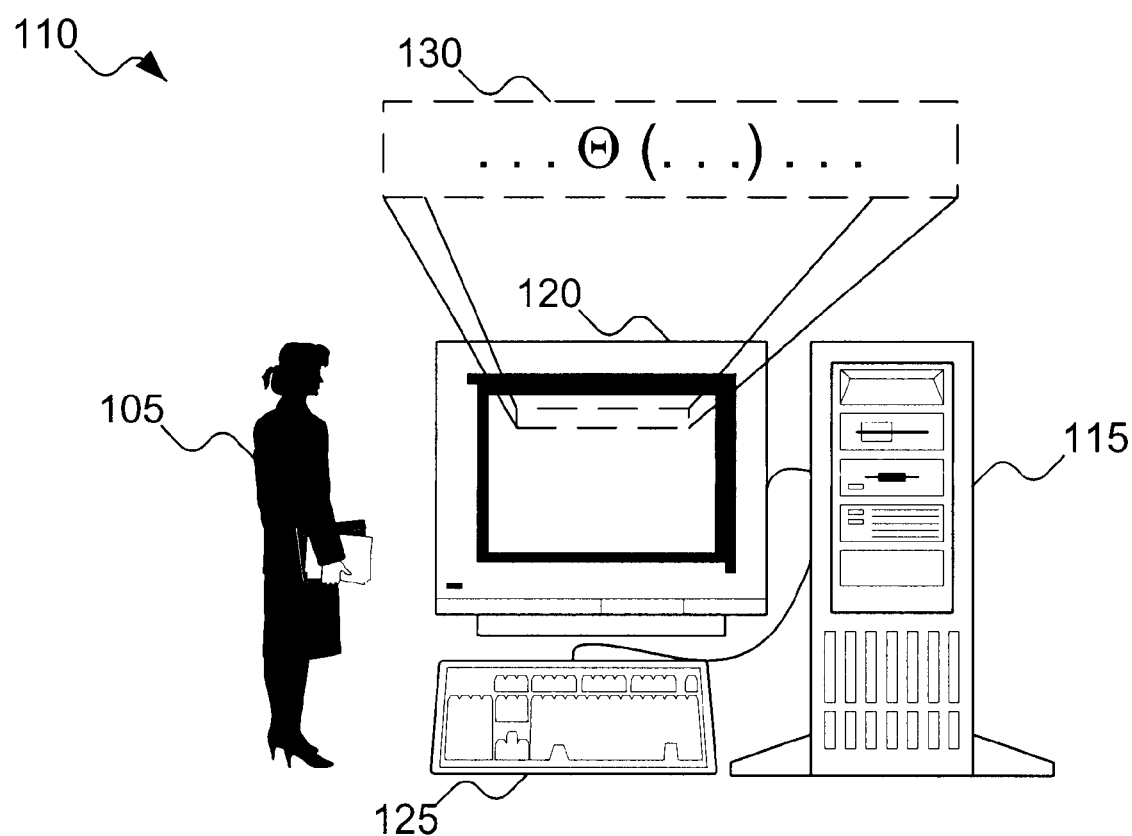
FIG. 1 shows a user using a computer system according to the invention to generate a query for a database.

Although a person skilled in the art will understand that a correlation operator can be added to queries for any type of database, this description will discuss correlation operators in the context of queries on arbitrarily structured records. As background, some concepts associated with arbitrarily structured records and query syntax are explained below. Much of this background material comes from U.S. patent application Ser. No. 08/749,575, filed Nov. 15, 1996, titled "Heterogeneous Record Search Apparatus and Method," which is incorporated by reference.

1. Arbitrarily Structured Records

Arbitrarily structured records have many useful and unique properties. For example, despite the fact that one may use "record typing" to classify records with common attributes, the primary usefulness of records in a database lie in the fact that they are distinguishable from one another. Typically, this distinction arises from the fact that any two real world objects of the same type, although having the same set of common attributes, will still have different "content" (or values) in one or more of those attributes. However, attribute values need not be the only means of distinguishing between objects of the same type. Another method for distinguishing is to allow the existence or non-existence of attributes as well as their relationship to other attributes to be additional distinguishing factors between objects that are otherwise of the same type. Objects that exhibit these kinds of differences between one another have traditionally been considered to be of different types (or classes). Forcing a new record type to be defined to handle all such unique cases will sometimes result in an awkward modeling of real world objects.

In contrast to records whose attributes are determined solely according to a record type definition, an arbitrarily structured record is one whose attributes might not be completely (or not at all) predetermined by a record type definition. In a schema-structured record, the creator of a record cannot add new attributes to the record or otherwise alter its makeup. The makeup of the record is predetermined by a record type definition. The creator of the record is limited to assigning content (or values) to the defined attributes. No such constraints need exist for arbitrarily structured records. The creator of an arbitrarily structured record is allowed to determine the makeup of the record.

Field Context

One of the primary features a creator has in constructing an arbitrarily structured record is the ability to determine a field's context within the record. A field's context refers to the field's position in the record with respect to other fields in the record. In an arbitrarily structured record, a field may be placed immediately subordinate to another field. In such a relationship, the subordinate field is referred to as the child field. The field it is subordinate to is referred to as the parent field. A field may have only one parent field. Multiple fields may have the same parent field, in which case they may be referred to as sibling fields. Any field may simultaneously be a parent field, a child field, and a sibling field within a given record structure. By creating parent/child relationships, one may build a hierarchical record structure. Other potentially interesting relationships may exist between fields besides parent, child, and sibling. Continuing the ancestral model, these may include uncle/aunt, nephew/niece, grandparent, first child, last child, $n^{th}$ child, first sibling, last sibling, $n^{th}$ sibling, and the like. The field at the top level (first ancestor) of an arbitrarily structured record may sometimes be referred to as the record's root field. The field identifier for this field may also be considered to be the record's "type" because it may supply an overall context for all other fields in the record that descend from it.

One interesting facet of a field's context is the field's direct ancestry (parent, grandparent, etc.). A list of fields from some ancestor field (parent, grandparent, great grandparent, etc.) to some descendant field (child, grandchild, great grandchild, etc.) may be referred to as a field path. A full field path starts at the root field of a record.

One convention for showing a field path is to show each field name in a path starting at some ancestor field and moving down to the descendant field, separating each field name with a delimiter, such as a period. For example, the field path BIRTH.ADDRESS.CITY may specify a field path where the BIRTH field is a parent to the ADDRESS field, and the ADDRESS field is a parent to the CITY field.

If two field paths are identical from the ancestor field down to the descendant field, they are said to be matching field paths. If they are the same from the ancestor field down to some arbitrary level, and different from that level down to the descendant field, they are said to be partially matching field paths. If the ancestor fields of two field paths are different, they are said to be non-matching field paths.

A field path may clarify the intended meaning of a field at the end of the path by placing it in context. The longer a field path, the more precisely it may clarify the meaning of the field at the end of the field path. For example, a field CITY all by itself may have many potential meanings. When placed as a child to a field ADDRESS, it becomes clear that the CITY field is part of some address. Placing ADDRESS subordinate to a field BIRTH may give even more context and indicates that the city is part of some birth address. In this manner, besides a meaning that is normally conveyed in field content, the creator of an arbitrarily structured record may impart additional meaning by manipulating record structure.

Thus, in a database that allows arbitrarily structured records, it is conceivable for every record in the database to have a slightly, or even radically, different makeup. What is important is that context should provide four pieces of information: parent field, first child field, previous sibling field, and next sibling field. So long as this information is known for any field, context is sufficient to define an entire hierarchy of fields within a record.

Repeating Fields

Another important feature of arbitrarily structured records may be the ability to create multiple occurrences of a field in a record. Each occurrence of a field may be at any given level of a record. For example, suppose a record is created to represent a person. One field in the record might be FIRST_NAME. If the person happens to have several versions of their first name (e.g., James, Jamie, Jim, Jimmy), these values may be represented in a series of sibling fields somewhere within the record. In addition, a FIRST_NAME field may be placed beneath a SPOUSE field in the same record to include the name of the person's spouse. From this, it can be seen that a field may repeat in a single context or multiple contexts within the same record.

Contextually Related Fields

As stated above, the context of a field in an arbitrarily structured record serves two important purposes: it imparts meaning to the field content, and it defines relationships with other fields. One type of relationship between fields in an arbitrarily structured record is a contextual relationship. This is particularly important with repeating fields. Suppose, for example, that a record is designed to represent a company, and that the information to be stored includes address. It may be possible to represent the address information using STREET, CITY, STATE and ZIP fields. If a particular company has several addresses, however, these fields would repeat in the record. If the record designer placed these fields together as children of the root field, there would be no clear way to determine which STREET field belonged to which CITY field, and so on. If a company had n addresses, there would be $n^4$ possible combinations of the four component fields. As a result, individual addresses would be lost because their components had no unique contextual relationship. By creating an ADDRESS field and placing the other fields beneath it, the record designer may create a unique and exclusive interrelationship between those fields in addition to adding meaning through context.

2. Queries

Any application that relies on a database system to store data needs a mechanism for retrieving that data. The functionality that a database system provides for finding and retrieving data constitutes the database system's query capabilities. These query capabilities may be embodied in an executable characterized as a query engine.

Definition of a Query

A query may be thought of as a request for information from a database. Specifically, it may request a set of records that satisfy certain conditions, or criteria, sometimes called selection criteria. In a logical sense, a selection criterion is a predicate that evaluates to a {TRUE} or {FALSE} result for the contents of any given record in a queried database. Typically, selection criteria compare the contents of specific fields within a record to constants, the contents of other fields inside the same record, or arithmetic expressions involving the contents of other fields in the same record.

For example, {LAST_NAME="Davis"} is a predicate comparing the contents of a LAST_NAME field with the string constant "Davis." Similarly, {LAST_NAME= ALIAS_NAME} is a predicate comparing the contents of a LAST_NAME field to the contents of an ALIAS_NAME field. Another predicate may be {SALARY<MINIMUM_ RANGE+1000*YEARS_IN_GRADE}. This predicate compares the contents of the SALARY field to an arithmetic expression involving the contents of the MINIMUM_ RANGE field and the contents of the YEARS_IN_GRADE field.

Selection criteria may be simple or complex. Complex selection criteria may be formed by Boolean operations like ANDing or ORing multiple comparison expressions. For example, {(LAST_NAME="Davis" OR ALIAS_NAME= "Davis") AND FIRST_NAME="Jim"} refers to alternatives. So long as "Jim" matches the content of a FIRST_ NAME field, "Davis" will satisfy the query if it appears in either the LAST_NAME or ALIAS_NAME field.

Query Syntax

Database systems typically have well-defined rules and grammar for expressing selection criteria, known as query syntax. Generally speaking, query syntaxes follow standard industry practices for constructing Boolean expressions. There are two main components in query syntaxes: operators and operands. Operators perform some operation on one or more operands, resulting in a value or result.

Operators

Operators may include logical (Boolean) operators (AND, OR, NOT). They also may include comparison operators for equality, less than, less than or equal to, greater than or equal to, greater than, and inequality (=, <, <=, >=, >, !=). Arithmetic operators may include addition, subtraction, division, multiplication, modulo operations, and the like (+, −, /, *, MOD, etc.). Binary operators require two operands, whereas unary operators require only one operand.

Operands

Operands may be atomic or complex. An atomic operand may be the contents of a field within a record, a constant (e.g., string, integer, etc.), or a list of distinct values. A complex operand may be merely another expression. Whenever an expression is supplied as an operand to an operator, the expression may be evaluated and the result of the expression used as a value in the corresponding operation.

The SALARY example above illustrates this principle. The less than operator (<) is a binary operator requiring two operands. In the expression in this example, the first operand for the less than operator is the content of the SALARY field. The second operand is an arithmetic expression involving the contents of the MINIMUM_RANGE field and the contents of the YEARS_IN_GRADE field. In order to return a result for the less than operator, the arithmetic expression will be evaluated first. The result will be used as the right hand operand in the "less than" comparison. In this example, the arithmetic expression is further decomposable into other simpler arithmetic expressions. In general, a complex operand may be recursively decomposed to a level at which the operands are all atomic operands. Results from lower level operators are used as operands by each succeedingly higher level operator.

An atomic operand may be a list of distinct values. Certain reasons and uses for this arrangement include the use of repeating fields. As a matter of convention, an operand's value (or list of values) will be denoted using braces ({ }) to enclose the value (or list of values). If more than one value exists, each value will be separated (delimited) by a comma. In the example {LAST_NAME= "Davis"}, LAST_NAME is the left operand for the equal (=) operator. The left operand actually represents the contents of the LAST_NAME field in a current record being evaluated. If the contents of the LAST_NAME field in the current record were "Jones," the operand's value may be denoted as {"Jones"}. If LAST_NAME were a repeating field within the current record and occurrences had the value "Jones" and the value "Peterson," the operand's value may be denoted as {"Jones", "Peterson"}. The right operand, which is the string constant "Davis," may be denoted as {"Davis"}.

3. Querying Arbitrarily Structured Records

The topics of context, repeating fields, and contextually related fields pose interesting problems for querying arbitrarily structured records. These problems stem from the need for symmetrical capabilities in storage and retrieval. In other words, a user of a database management system that stores arbitrarily structured records must be able to construct a query that explicitly searches on any implicit meaning imparted by field context. Thus, the methods for evaluating selection criteria for arbitrarily structured records may include capabilities not found in traditional query engines.

Specifying Field Context

As described, an arbitrarily structured record may be hierarchical in nature. Any field may appear at any level in such a hierarchy. Occurrences at many different levels may represent a different meaning for each occurrence.

To differentiate, a query engine needs to be capable of evaluating a field's context as well as its content. The framer of a query may specify a field's context when referencing the field in selection criteria. Partial, full, or no context may be specified.

The query engine may extract contents of a field referenced in a selection criterion. Extraction may be limited to occur only if the field is found in the specified context. The degree or level at which the field context is specified may be selected by a framer of a query. The query engine may then recognize the context and level of context in order to restrict a search to more (or less) specific meanings of the field.

For example, the field CITY may be used in various arbitrarily structured records within the same database to represent birthplaces, current residences, business addresses, and the like. A selection criterion {CITY="Salt Lake"} may be part of a somewhat broad and unfocused query, absent context. When the creator of these different records identifies the CITY field as subordinate to other fields, that context gives additional meaning. For example, BIRTH, RESIDENCE, BUSINESS, etc. may focus the query. To focus only on birth cities, the selection criterion may be changed to {BIRTH.CITY="Salt Lake"}.

Repeating Fields

A repeating field may be referenced in a selection criteria, and occur more than once in a record currently being evaluated by a query engine. Except when used in a field existence predicate, a repeating field may potentially yield multiple distinct values (in a field existence predicate, a repeating field will yield precisely one value: {TRUE}). Each value represents a distinct evaluation path. For a database that allows arbitrarily structured records, a query engine needs to include mechanisms to deal with the possibility of repeating fields in a record. One such mechanism is the concept of quantifying operators. Quantifying operators include a universal quantifier ("for every" operand) and an existential quantifier ("for some" operand).

Conceptually, an effect of the universal quantifier may be to ensure that a comparison operator or logical operator is {TRUE} for every combination of operand values. Typically, this may be used on a comparison operator to ensure that the comparison is {TRUE} for all occurrences of a field that is being compared to some other value. For example, for a selection criterion {GPA>3.5}, one may evaluate a STUDENT record that has a GPA recorded (field and value) for every semester of attendance. Thus, GPA may be a repeating field in the STUDENT record. If some semesters have GPAs less than 3.5 and some are greater than 3.5, this selection criterion will return a {TRUE, FALSE} value. If all semester's GPAs are greater than 3.5, this selection criterion will return a {TRUE} value. If all semester's GPAs are less than or equal to 3.5, this selection criterion will return a {FALSE} value.

Conceptually, the existential quantifier may ensure that a comparison operator or logical operator results in a value of {TRUE} if at least one combination of operand values results in a {TRUE}. Typically, this may be used with a comparison operator (as operand) to ensure that the result of such comparison is {TRUE} for at least one occurrence of a field that is being compared to some other value. Using the example of a GPA field, above, change the criterion to {SOME (GPA>3.5)}. The selection criterion will now result in a return of {TRUE} if at least one of the semesters' GPAs is greater than 3.5. This occurs regardless of whether other GPAs are less than or equal to 3.5.

Contextual Correlation of Query Fields

When evaluating selection criteria involving one or more fields that happen to repeat in an arbitrarily structured record, it is critical for a query engine to provide the capability to express the concept of contextual relatedness. Field path expressions are not enough to establish contextual relatedness in selection criteria. For example, consider the case of a company record containing multiple ADDRESS fields, each of which has child fields of STREET, CITY, STATE, COUNTRY, and ZIP. Suppose a particular company has the following two addresses:

1234 Shady Lane, Frankfurt, Ky., USA 54321

6789 Eingang Strasse, Oberursel, Germany.

Now suppose the following query is posed: ((ADDRESS.CITY=="Frankfurt") && (ADDRESS.COUNTRY=="Germany")). Note that the field path expressions contain no information about specific instances of the fields: only context is identified. Without any further clues in the selection criteria or the record itself, the query engine may evaluate all combinations of ADDRESS.CITY and ADDRESS.COUNTRY, returning the sample record in spite of the fact that it may not satisfy the intent of the query. This problem may be addressed by a new correlating operator, Θ (the Θ designation is intended to facilitate notation herein, and not to propose a name). This operator may be used to explicitly identify contextual relatedness for sets of field paths found in selection criteria. In the above example, if the query were expressed as follows: Θ((ADDRESS.CITY=="Frankfurt") && (ADDRESS.COUNTRY=="Germany")), the query engine would only evaluate combinations of CITY and COUNTRY fields that were children of the same ADDRESS field. As a result, the sample record would not be included in the query results.

The concept of context relatedness as expressed by the Θ operator and field path expressions is subject to the following rules:

1. Instances of matching field paths are considered by the query engine to be contextually related if and only if they are the same instance. Suppose, for example, that a record contains two FIRST_NAME fields with contents of Hank and Jack, respectively. The following selection criteria:

Θ((FIRST_NAME=="Hank") && (FIRST_NAME=="Jack")) would evaluate to {FALSE}, because both sides of the predicate would be interpreted as referring to the same instance of FIRST_NAME. On the other hand, if the Θ operator is removed from the selection criteria, the expression now evaluates to {TRUE} for the same record, because separate (and hence unrelated) instances of FIRST_NAME satisfy the two sides of the predicate.

2. Instances of non-matching field paths are contextually related if and only if the ancestor fields of the respective field paths are siblings in a record. Consider the following query: ((BIRTHPLACE.STATE=="Utah") && (ADDRESS.CITY=="San Francisco")). The only fields in a given record that will be used to evaluate the query will be fields where BIRTHPLACE and ADDRESS are sibling fields under the same parent field.

3. Instances of two partially matching field paths are contextually related if and only if the following are true:

The instances of the matching parts of the field paths are the same, and

The instances of the first non-matching level of the field paths are siblings.

Consider, for example, the following query:

Θ((EMPLOYEE.DEPENDENT.BIRTHPLACE.CITY== "Portland") && (EMPLOYEE.DEPENDENT.FIRST_NAME== "Phyllis")). When evaluating this selection criterion, the query engine will only consider instances of FIRST_NAME and BIRTHPLACE.CITY where FIRST_NAME and BIRTHPLACE are siblings under the same instance of EMPLOYEE.DEPENDENT.

4. Correlation Without the Correlation Operator Θ

Consider the following hypothetical situation: The State decides to keep a record of all car owners and their vehicles. LaVerkle Finkelmeister, the lead project analyst for the State, decides to structure a data relationship called "owner record" as follows:

owner=
   Social Security Number
   Name
   *Address
   *Vehicle where * indicates a (possibly) multiple-valued field. In our case, Finkelmeister has decided that a car owner may have more than one address in the State, and certainly may have more than one registered vehicle. Of course, Finkelmeister could have duplicated Social Security Number, Name, and Address information for each vehicle (a "flat" table), but Finkelmeister is a believer in aggregate form.

One year later, Belva Stumph is injured when struck by a car. The driver of the car did not stop, and nobody took note of the license plate number, but a bystander did notice that the car was a late fifties puce Rutabaga. Detective Spudnucker is told to search Finkelmeister's database for owners of puce Rutabagas.

How should Spudnucker form his query? He might say to himself, "Hmm. I guess I want to see all owner names where vehicle color is puce and vehicle make is Rutabaga!" But if we execute this as an LDAP query on Finkelmeister's record structure without the implicit assumption of a correlation operator, Spudnucker might be surprised at the results. This is because thousands of enthusiastic Zhorgledites live in the State. The Zhorgledites are a private club with an admission requirement: a member must own both a puce Whorly Hog (a sweet road bike) and a teal Rutabaga. So Spudnucker's query "find all owner records where vehicle.color=puce and vehicle.make=Rutabaga" will unfortunately include every devout Zhorgledite in the State. Remember: with LDAP attribute queries are assumed to be independent of each other. So in LDAP-ese the above query really means, "find all owner records where for some vehicle, vehicle.color= puce and for some vehicle, vehicle.make=Rutabaga."

One might try to resolve this dilemma by stipulating that all queries are understood to be formed with respect to a relational model, regardless of the actual physical structure of the database (hierarchical, etc) or the logical structure (as expressed by the schema). The argument usually put forward to support this approach goes something like, "Everyone who is anyone knows Sequel, and Sequel almost totally dominates the university scene. So all queries should interpreted as if made against an underlying relational model, since everyone (who matters) thinks relationally." But database designers usually structure logical data relationships for some (presumably good) reason, and one ignores such structure at one's peril, as we shall soon see.

Finkelmeister's new boss Sequella is a relational bigot. Upon taking the job—less than a month before Belva's accident—she tells Finkelmeister that database queries must be implicitly relational.

Finkelmeister decides to write a generic transform that simply "flattens" the structure of interest. Otherwise, he would have to educate every user as to the decomposition of the record into tables. But he figures everyone understands the structure of a flat table, since Sequella has decreed that everyone think relationally.

So, Sally Nightshade's record:

owner =

Social Security Number = 001 02 0003
   Name = Sally Nightshade
   Address =

Street = 666 Devil's Drive
      City = Gomorrah
      Zip = 22222
      Street = 444 Innocent Way
      City = Goodville
      Zip = 33333
   Vehicle =

Make = Bolvo
      Model = Blaster
      Year = 1984
      Color = vermilion
      VIN =
      Make = Rutabaga
      Model = Tuber
      Year = 1957
      Color = puce
      VIN =

| SSN | Name | Street | City | Zip | Make | Model | Yr | Color | VIN |
| --- | --- | --- | --- | --- | --- | --- | --- | --- | --- |
| 001020003 | Sally Nightshade | 666 Devil's Drive | Gomorrah | 22222 | Bolvo | Blaster | 1984 | vermilion | — |
| 00020003 | Sally Nightshade | 666 Devil's Drive | Gomorrah | 22222 | Rutabaga | Tuber | 1957 | puce | — |
| 001020003 | Sally Nightshade | 444 Innocent Way | Goodville | 33333 | Bolvo | Blaster | 1984 | vermilion | — |
| 001020003 | Sally Nightshade | 444 Innocent Way | Goodville | 33333 | Rutabaga | Tuber | 1957 | puce | — | with respect to any query. So now the query "find all owner records where color=puce and make=Rutabaga" will work just fine! But there is a snake in the relational grass. To find it, we must develop our story a little further.

It so happens that late fifties puce Rutabagas are extremely popular in the State. Spudnucker needs to further qualify his search to have any hope of finding the perpetrator. Fortunately, Belva—who has no conscious memory of the incident—has agreed to interrogation under hypnosis.

"I heard a voice, screaming, 'Got you, you old hag! That's for letting your door open into my beautiful vermilion Bolvo day before yesterday, in the parking lot of Lumpie's Food King!'" whimpers Belva, deep in trance. Spudnucker, who is present during the questioning, stands quietly for some time afterward, staring abstractedly into space. "Hmmm,"

says Spud to himself. He is trying to figure out how to form his query. He knows what he wants—a list of everyone who owns both a puce Rutabaga and a vermilion Bolvo. But how does he ask for it?

Spudnucker's only hope is to make a query of the form

"join (T to T) where (t.x R t.y) result (t.z)."

In Spud's particular case this would be,

"join ((owner alias $O_1$) to (owner alias $O_2$)) where ((($O_1$.vehicle.make=Bolvo and $O_1$.vehicle.color= vermilion) and ($O_2$.vehicle.make=Rutabaga and $O_2$.vehicle.color=puce)) and ($O_1$.SSN=$O_2$.SSN))

result ($O_1$.name)."

So, let's examine Sequella's expectations of Spudnucker's thought process as he considers how to form his query. "Well," says Spud to himself, "I've got to form the cross-product of the owner table with itself. I should alias each instance of the table in the cross-product, so I can qualify the subset of the cross-product I want without ambiguity. In this case there is no inherent order-dependency on the qualifiers, so without loss of generality I can stipulate a vermilion Bolvo in the first aliased table and a puce Rutabaga in the second aliased table, intersected with SSN in the first table equal SSN in the second table. Finally I'll project the name—again without loss of generality—hmm, let's say from the first table."

For a doughnut eating good-ol'-boy, Spud better have a pretty hot-damn handle on set theory.

5. Correlating With the Correlation Operator $\Theta$

By contrast, how would Spudnucker be expected to frame a correlated query against Finkelmeister's aggregate form? "Well," says Spud to himself, "I've got to find all people who own a vermilion Bolvo and a puce Rutabaga." In other words, the correlated query preserves the relationships that are inherently expressed in the logical structure of the data. The correlated query does this without significantly altering the user syntax of a query expression; it simply extends the semantics of the query expression to reflect relationships intrinsic to the data. Using the correlation operator $\Theta$, Spud's query, "find all owner records where (vehicle.color= puce and vehicle.make=Rutabaga) and (vehicle.color= vermilion and vehicle.make=Bolvo)" is re-expressed as "find all owner records where $\Theta$(vehicle.color=puce and vehicle.make=Rutabaga) and $\Theta$(vehicle.color=vermilion and vehicle.make=Bolvo)" to the directory search engine. The correlation operator $\Theta$ can be introduced either explicitly by the user, or implicitly through a query/schema reconciliation mechanism that inserts a $\Theta$ before every left parenthesis where compatible with the schema.

6. The Algebra of $\Theta$

The $\Theta$ operator has the following properties:

1. The $\Theta$ operator is unary (i.e., it has only one operand, which itself can be a complex operator expression).
2. The $\Theta$ operator distributes across an OR operator. This is because the concept of context relatedness does not span an OR operator. Consider the selection criteria: ((x==1)|| (y==2)), where x and y are field paths. This predicate is true if either side is true, regardless of context.
3. If the predicate that forms the operand of a $\Theta$ operator contains only one field path, the $\Theta$ operator is a no-op. For example, the selection criteria $\Theta$(FIRST_NAME=="Englebert") is the same as (FIRST_NAME=="Englebert"), because by definition, a single field path is contextually related to itself.

A query involving correlated sub-queries (well-defined parts of the query expression, which may include the entire query expression) resolves to the following steps:

1. Eliminate all NOT operators using DeMorgan's laws to transform the query. Note that in an implementation where the $\Theta$ operator has a "for some" property (existential quantifier), a NOT operator will change this to a "for every" property (universalquantifier).

For example, suppose the following query:

!($\Theta$(P1 && P2))

has an implied "for some" property on the CORRELATE operator. After the DeMorgan's transformation, the query looks as follows:

$\Theta$(!P1||!P2)

The $\Theta$operator now has an implied "for every" property.

2. Eliminate $\Theta$ operators from the tree. If a $\Theta$ operator is immediately above an OR operator, it is distributed to each of the operands (the criteria specified by the sub-query that is in the scope of the correlation operator) of the OR operator. If it is immediately above an AND operator or a comparison operator, it is associated with the operator by setting a "correlate" flag on the operator. The following examples illustrate:

(a) $\Theta$(P1 && P2)==>P1 &&(correlate flag) P2

(b) $\Theta$(P1||P2)==>$\Theta$(P1)||$\Theta$(P2).

(c) $\Theta$((P1 && P2)||(P3 && P4))==>$\Theta$(P1 && P2)||$\Theta$(P3 && P4)==>(P1 &&(correlate flag) P2)||(P3 &&(correlate flag) P4)

(d) $\Theta$($\Theta$(P1 && P2)||$\Theta$(P3 && P4))==>$\Theta$(P1 && P2)||$\Theta$(P3 && P4)==>(P1 &&(correlate flag) P2)||(P3 &&(correlate flag) P4)

Note that the net effect here is identical to example c.

(e) $\Theta$(P1 && P2 && P3 && P4)==>(P1 &&(with correlate flag) (P2 && (P3 && P4)))

Note: The correlate flag only needs to be set on the highest level AND operator. The correlate flag does not need to be set for every AND joining sub-queries within the correlation operator $\Theta$.

(f) $\Theta$(P1 && (P2||P3))==>P1 &&(correlate flag) (P2||P3)

Note: This query will be further transformed in later steps.

NOTE: A query of the form shown above in (a) is illegal if P1 and P2 contain fields from different candidate sets. For example:

$\Theta$((CS1.X==7) && (CS2.Y==5))

is illegal. This is because if X and Y are from different structured attributes (candidate sets), it does not make sense to attempt to determine a correlated context when evaluating the query.

3. Transform the query into a disjunction of conjunctions. This is done by "stratifying"—that is, distributing all AND operators over OR operators. Queries/sub-queries of the following form:

P1 && (P2||P3)

will be transformed to the following form:

(P1 && P2)||(P1 && P3)

NOTE: During this transformation phase, the "correlated" flag associated with any AND operator is also distributed, as illustrated in the following example:

(g) $\Theta$(P1 && (P2||P3))

According to steps 1 and 2 above, this query will be transformed as follows:

(h) P1 &&(correlate flag) (P2||P3)

When the query is transformed in this step, it will look as follows:

(i) (P1 &&(correlate flag) P2)||(P1 &&(correlate flag) P3)

4. Separate the query at the "disjunction" points into multiple queries. These queries will hereafter be referred to as "partial sets," (PSET) because each query is executed in sequence to return a "part of" the entire query result set. The final result set for the query is the union of these partial sets.

Separate each partial set into "correlated sub-queries." This is done by traversing down the tree from the root-most node and clipping out sub-trees wherever an AND operator or comparison operator (EQ, NE, etc.) appears that has the "correlated flag" set. Note that it is possible for nodes lower in the tree to also have the correlated flag set, but it is not necessary to cut these out as separate correlated sub-queries. The following example illustrates:

Θ(Θ(P1 && P2) && (P3 && P4)) && P0

This query transforms as follows:

((P1 &&(correlate flag) P2) &&(correlate flag) (P3 && P4)) && P0

The corresponding query tree is as follows:

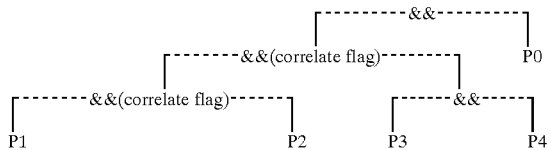

Note that a correlate flag at the higher level takes precedence over a correlate flag at lower level when it comes to partitioning a tree into correlated sub-queries. Thus, in this example, the correlate flag on the AND operator between P1 and P2 is ignored. In this example, we end up creating two independent sub-queries, one involving P0 and another involving P1, P2, P3, and P4. However, in general, depending on which AND operators or comparison operators are flagged as correlated, there can be any number of correlated sub-queries within the partial set.

7. Using the Correlation Operator Θ

FIG. 1 shows a user 105 operating a computer system 110. The computer system 110 includes a computer 115, a monitor, 120, and a keyboard 125. The computer system may include other peripherals not shown in FIG. 1, for example, a mouse, a printer, a modem, etc. The user 105 inputs her query into computer system 110 to query a database stored on computer 115. Blow-up box 130 shows the user's query in greater detail.

Figure 2:
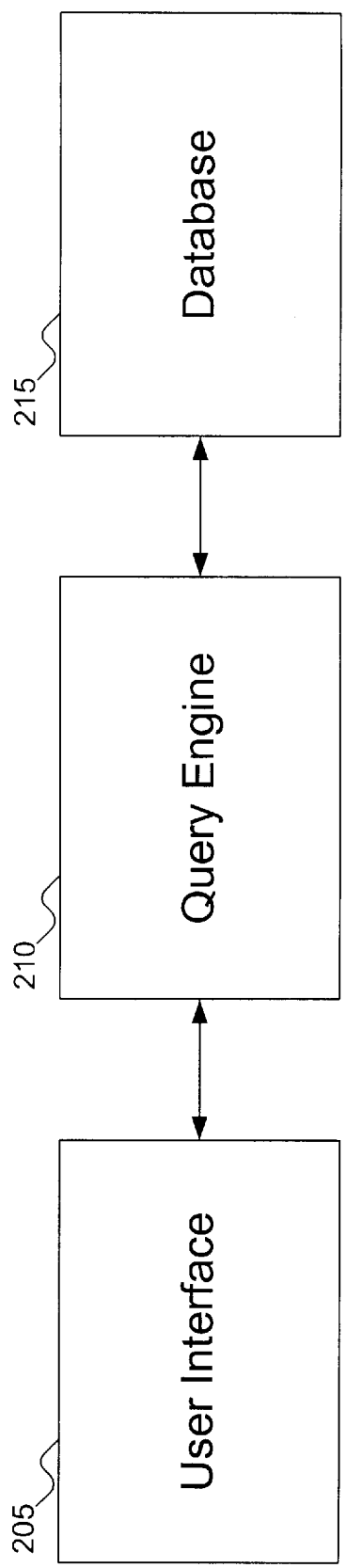
FIG. 2 shows the system levels of the computer system of FIG. 1.

FIG. 2 shows the layers on the computer system. The user 105 interacts most directly with the user interface 205. The user interface 205 receives the user's query and passes it to the query engine 210. The query engine 210 then parses the query, verifies that the query is properly constructed, and transforms the query into one which can be input into the database 215. The database 215 returns a result to the query engine 210, which displays the result to the user 105 on the user interface 205.

Figure 3:
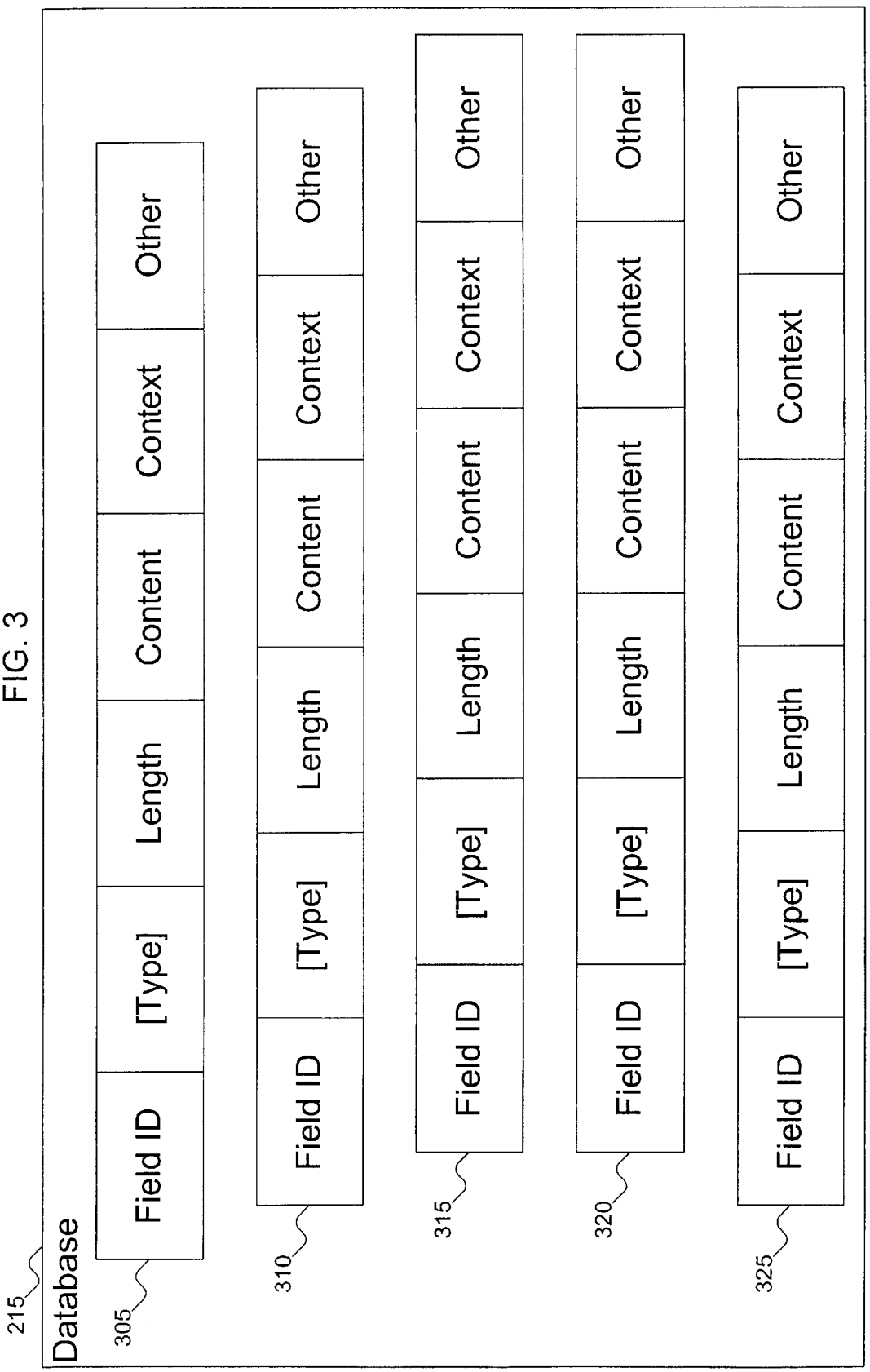
FIG. 3 shows an example of a database with arbitrarily structured records.

FIG. 3 shows an example of a database 215. The database includes a number of records, of which record 305 is an example. In this example, database 215 is constructed of arbitrarily structured records. The record 305 includes a variety of fields, such as the Field ID, the Type of the record, the Length of the record, the Contents of the record, the Context of the record, and other information. FIG. 3 shows five records, where indentation represents the parent-child relationship between records discussed above. In FIG. 3, record 305 is the parent to records 310 and 325, and record 310 has two children of its own, records 315 and 320.

Figure 4:
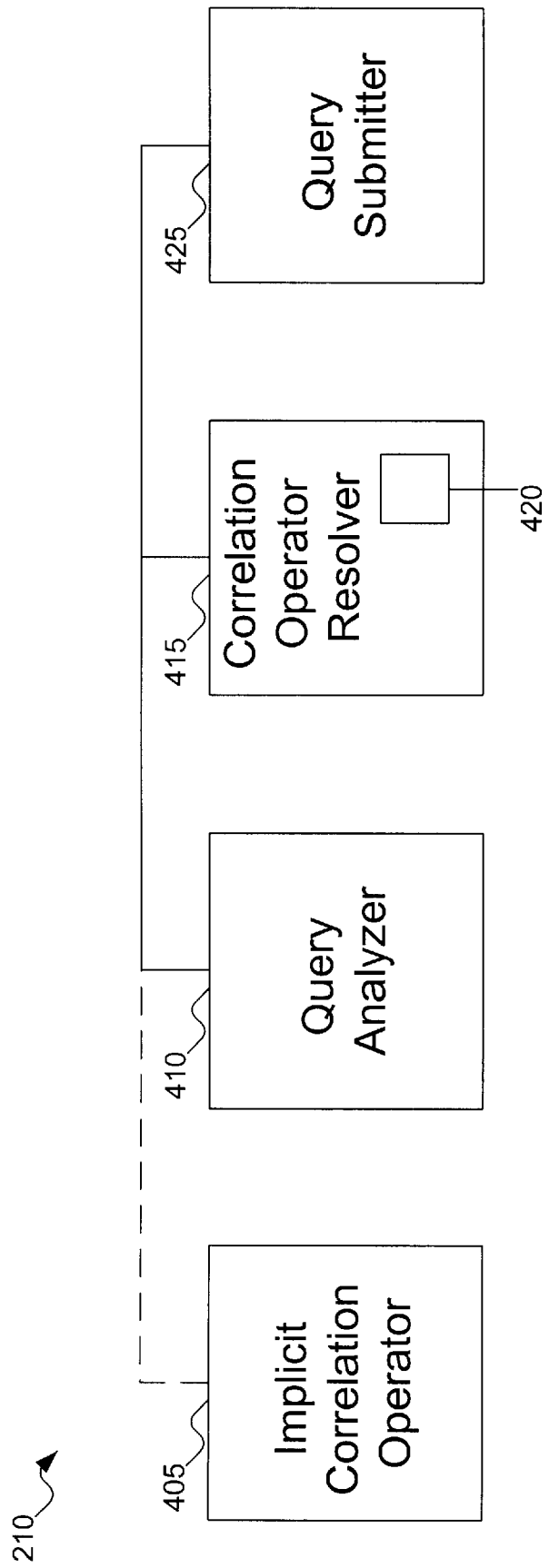
FIG. 4 shows the block components of the query engine of FIG. 2.

FIG. 4 shows the elements of the query engine 210. Query engine 210 has four elements, three of which are necessary and one which is optional. The Implicit Correlation Operator 405 is optional. Its purpose is to improve the results of a query by adding the correlation operator Θ automatically to the query where a correlation operator makes sense. Note that if implicit use of the correlation operator Θ is not desired, the Implicit Correlation Operator 405 can be removed from the query engine 210 without problem.

The second element of the query engine 210 is the Query Analyzer 410. The purpose of the Query Analyzer 410 is to make sure that any correlation operators in the query are used properly. The third element of the query engine 210 is the Correlation Operator Resolver 415. Its purpose is to resolve any correlation operators in a query, which inserted explicitly by the user or implicitly by the schema. Included in the Correlation Operator Resolver 415 is the Correlated Sub-query Pruner 420, which clips sub-trees from the tree of the query where a correlation flag is found. Finally, Query Submitter 425 submits the query to the database 215 after any correlation operators have been resolved. In general, submitting the query to the database 215 involves evaluating the query against some of the records in the database 215. In the context of correlation operators, submitting the query to the database 215 involves evaluating the query against some of the records in the database 215 with contextually related field combinations.

Figure 5A:
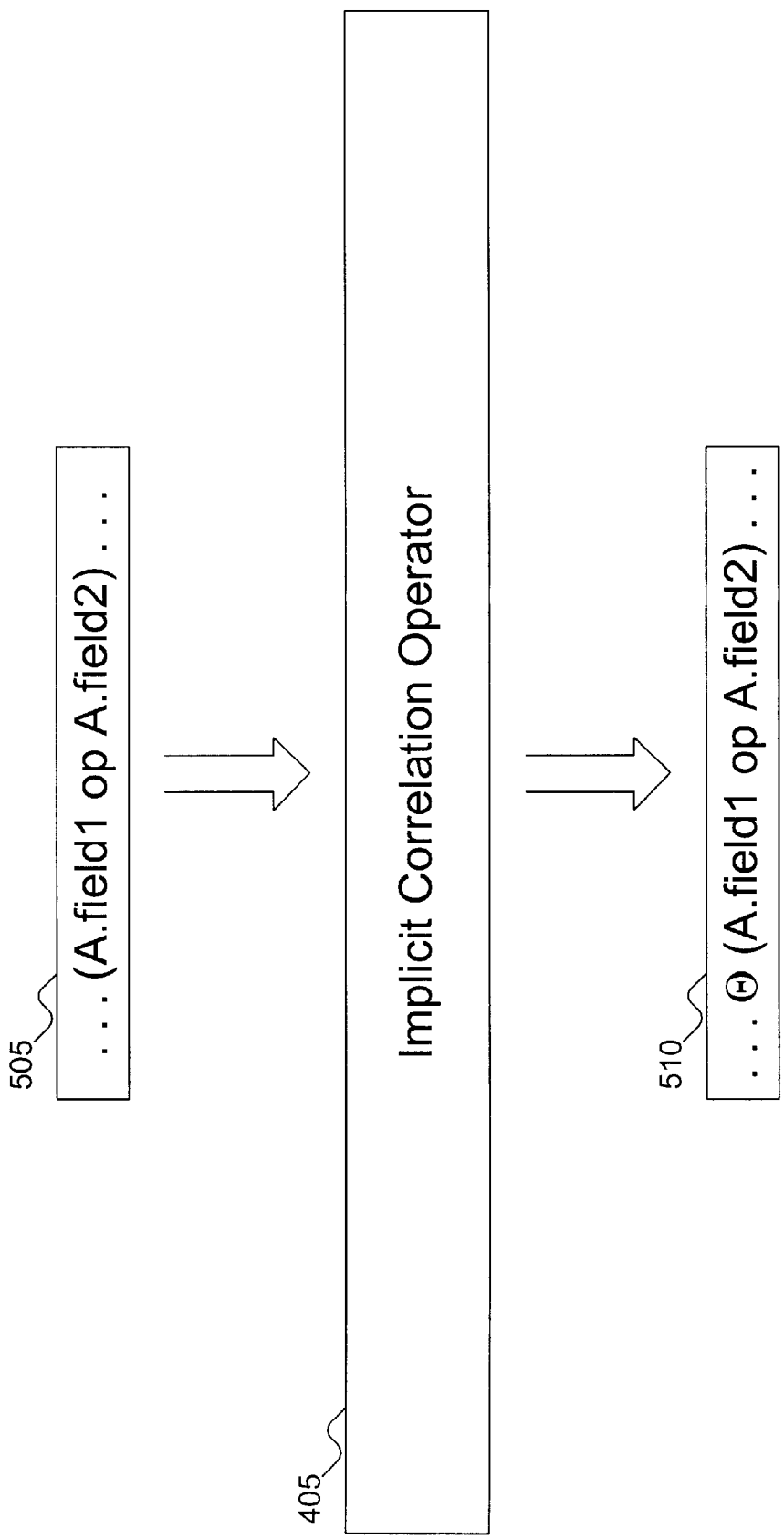
FIG. 5A shows pictorially how an implicit correlation operator of FIG. 4 is inserted in a query.

FIG. 5A shows how the Implicit Correlation Operator 405 operates. The Implicit Correlation Operator 405 scans the query for any operators that can be correlated and that have operands with different fields from common types. In query 505, the operator joins operands A.field1 and A.field2. Although the fields (field1 and field2) are distinct, they are fields of a common type (A). So, the Implicit Correlation Operator 405 inserts the correlation operator Θ over the operator, as shown in query 510.

In the preferred embodiment, there are two additional restrictions on the Implicit Correlation Operator 405. First, the Implicit Correlation Operator 405 only inserts implicit correlation operators over AND operators. Second, the Implicit Correlation Operator 405 requires that the operator and the operands the operator joins be grouped inside parentheses. However, a person skilled in the art will recognize that correlation operators can be inserted over any operator that can be correlated (e.g., comparison operators), and that rules of precedence can apply to remove the parenthesis requirement.

Figure 5B:
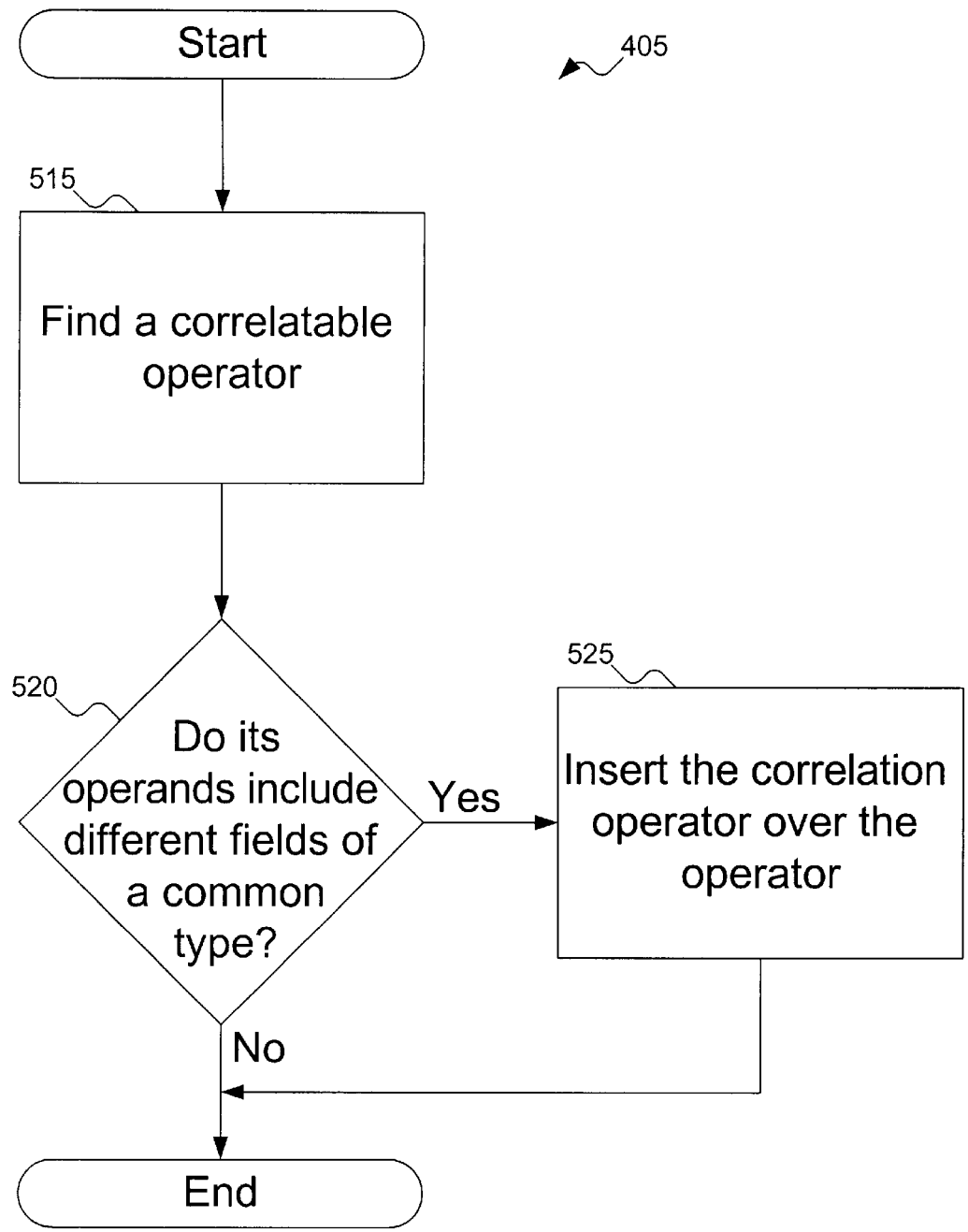
FIG. 5B shows a flowchart of how an implicit correlation operator of FIG. 4 is inserted in a query.

FIG. 5B shows the steps taken by the Implicit Correlation Operator 405. At step 515, the Implicit Correlation Operator 405 scans the query to find a correlatable operator. Once found, at step 520 the Implicit Correlation Operator 405 determines if the operands of the correlatable operator include different fields of a common type. If that condition is met, then at step 525 an implied correlation operator Θ is inserted over the correlatable operator. The process is then free to repeat until all correlatable operators have been examined.

Figure 6:
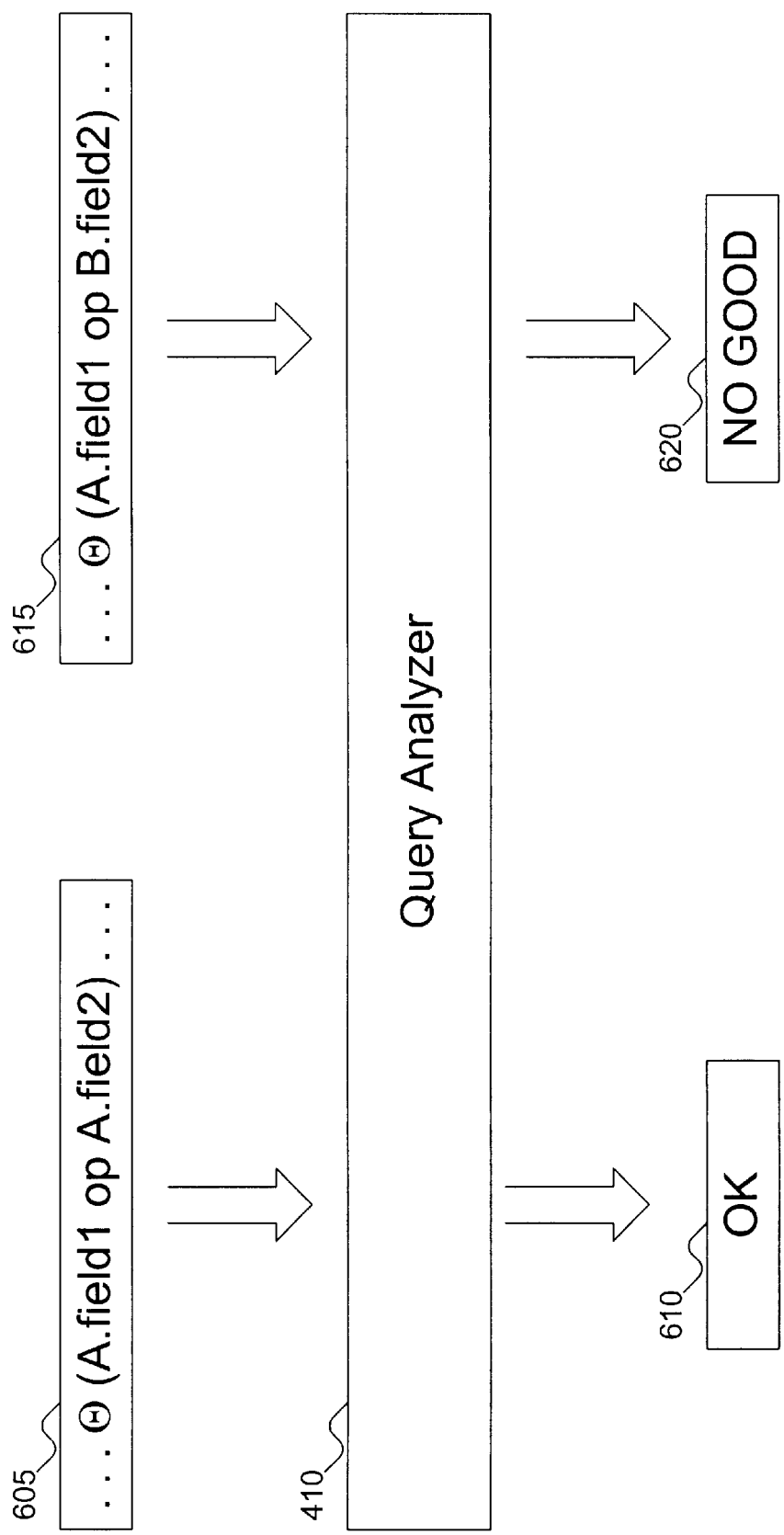
FIG. 6 shows pictorially the query analyzer of FIG. 4 verifying or denying a query.

FIG. 6 shows the Query Analyzer 410 analyzing two queries to verify they are properly constructed. Both queries 605 and 615 include correlation operators Θ. Query 605 applies its correlation operator over two fields of a common type, and is approved to be submitted to the database 215, as shown at 610. Query 615, on the other hand, includes fields of different types. Since there can be no correlation across types, query 615 is rejected, as shown at 620.

Figure 7A:
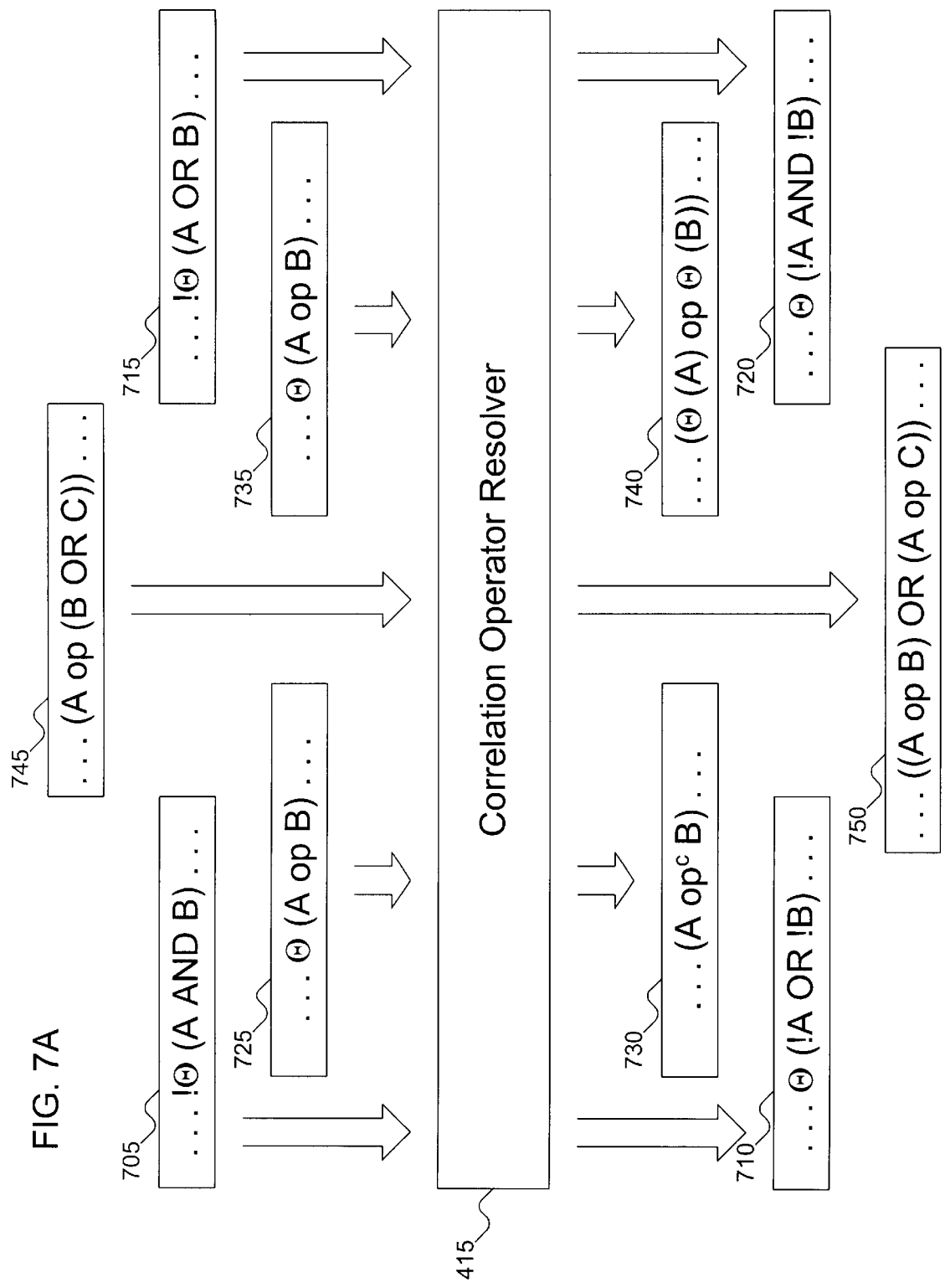
FIG. 7A shows pictorially how a correlation operator is resolved by the correlation operator resolver of FIG. 4 before the query is submitted to the database.

FIG. 7A shows pictorially how the Correlation Operator Resolver 415 resolves a correlation operator Θ. Five queries (705, 715, 725, 735, and 745) are shown, along with the results returned by the Correlation Operator Resolver 415 (queries 710, 720, 730, 740, 750). The Correlation Operator Resolver 415 implements the algebra of the correlation operator, discussed above. DeMorgan's laws are applied to queries 705 and 715, producing queries 710 and 720, respectively. In query 725, the operator joining operands A and B is correlatable (i.e., an AND or comparison operator). In query 730 which results, op$^c$ represents the operand of query 725 with the correlate flag attached. In an OR operator, which cannot be correlated, the correlation operator (is distributed to the OR operator operands, as shown in queries 735 and 740. Finally, queries 745 and 750 show how the query is reduced to Conjunctive Normal Form. Conjunctive Normal Form is a query form consisting of the disjunction (ORing operations) of a number of sub-queries, all consisting of conjunctions (ANDing operations). In queries 745 and 750, any correlate flags attached to the operator distributed over the OR operator also distribute over the OR operator.

Figure 7B:
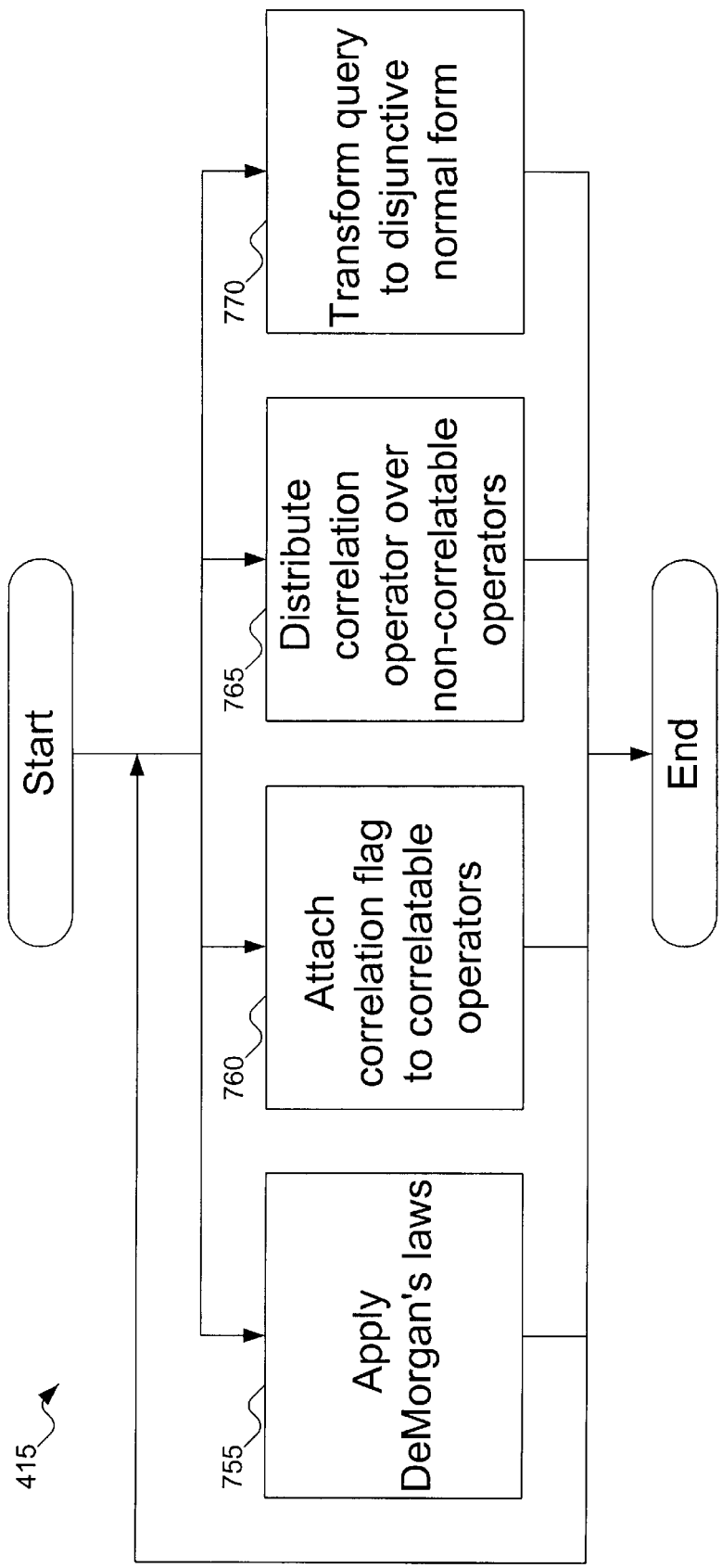
FIG. 7B shows a flowchart of how a correlation operator is resolved by the correlation operator resolver of FIG. 4 before the query is submitted to the database.

FIG. 7B shows a flowchart of how the Correlation Operator Resolver 415 operates. At step 755, DeMorgan's laws are applied to the query. At step 760, the correlation operator is removed where it operates over an operator that can be correlated. At step 765, the correlation operator is distributed over non-correlatable operators. Finally, at step 770 the query is transformed into Conjunctive Normal Form.

Figure 8:
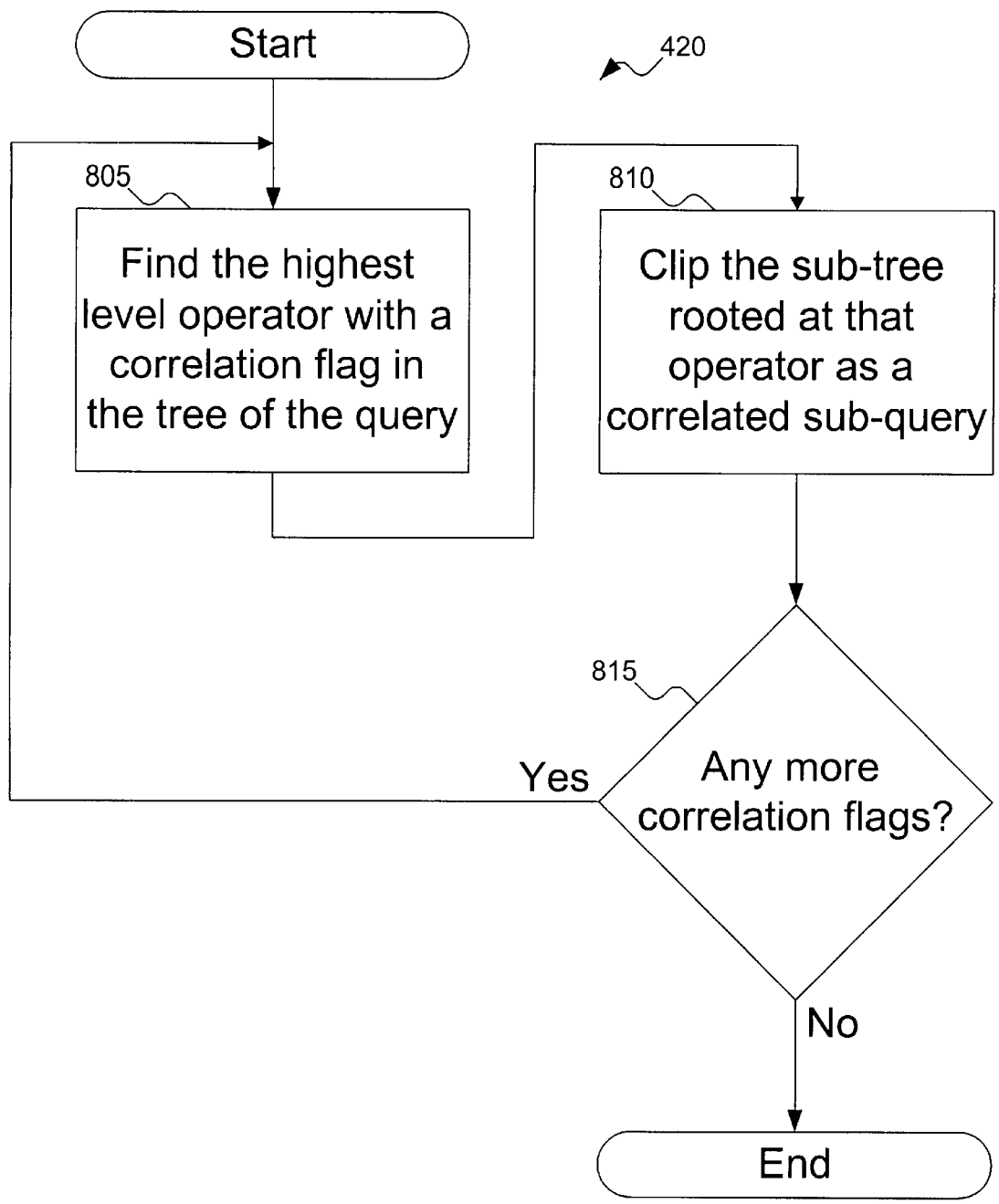
FIG. 8 shows a flowchart of how correlated sub-queries are pruned from the tree of the query in the correlation operator resolver of FIG. 4.
Figure 4:
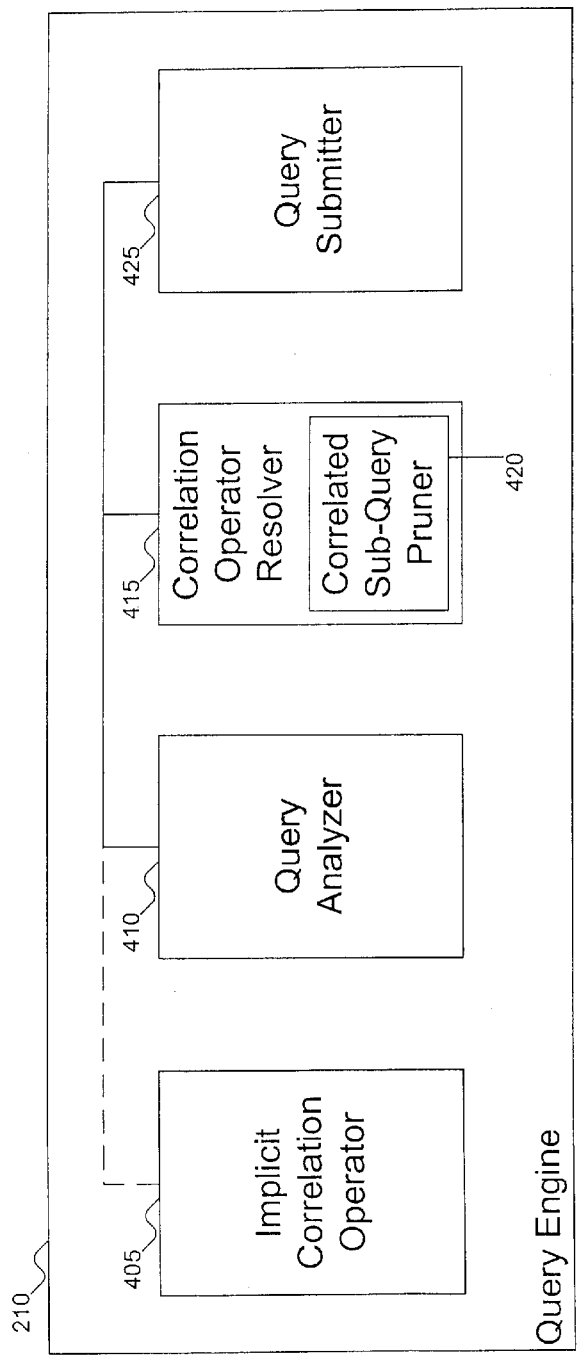

FIG. 8 shows a flowchart of how correlated sub-queries are pruned from the tree of a query. In the tree, each operator is a parent to its operands. The highest-level operator is at the root. Preparing a tree in this manner produces operators at each internal node of the tree, and fields, variables, constants, and other fixed forms of information at the leaves. The tree is then scanned for the highest-level operator with an attached correlation flag (step 805). The sub-tree rooted at this operator is then clipped from the tree as a correlated sub-query (step a 810). As discussed above, it is not important whether there are any lower-level operators with attached correlate flags. If there are any correlation flags attached to operators remaining in the tree (step 815), the process continues until all operators with correlate flags have been clipped from the tree.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

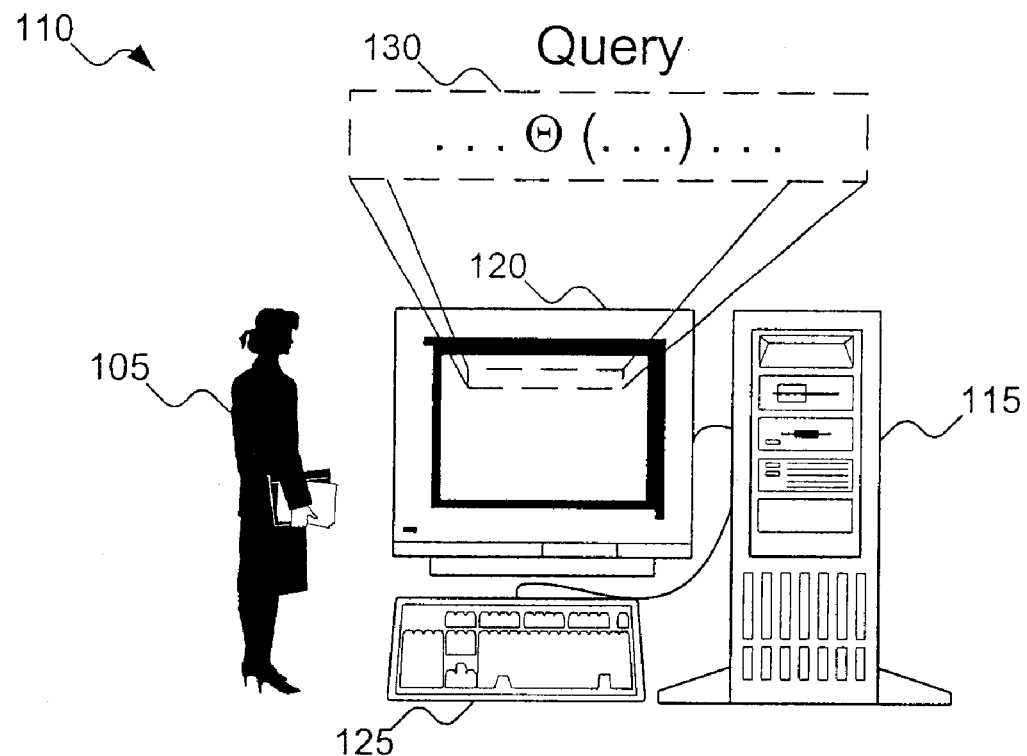

We claim:

1. A method for querying a database, stored in a memory coupled to a computer, and containing a plurality of records, so as to specify that the fields in a sub-query must share the same context or logical grouping within a record in order for that record to satisfy the criteria embodied in the sub-query, the method comprising:

receiving the query for the database, the query containing a correlation operator $\Theta$ and a sub-query comprising the operand for the correlation operator $\Theta$, the correlation operator $\Theta$ achieving contextual relatedness by matching field paths;

resolving the correlation operator $\Theta$ across the operand for the correlation operator $\Theta$; evaluating the query with the correlation operator $\Theta$ against at least some database records; and retrieving the database records that satisfy the query expression.

2. A method according to claim 1 wherein:

the correlation operator $\Theta$ includes an implicit existential quantifier ("for some" property); and resolving the correlation operator $\Theta$ includes finding a first combination of contextually related fields that satisfies the operand of the correlation operator $\Theta$.

3. A method according to claim 1 wherein:

the correlation operator $\Theta$, along with its operand, are in the scope of a NOT operator; and resolving the correlation operator $\Theta$ includes applying DeMorgan's laws to distribute the NOT operator across any logical operators (AND, OR, NOT) within the sub-query that comprises the operand of the correlation operator $\Theta$.

4. A method according to claim 3 wherein:

the correlation operator $\Theta$ includes an implicit existential quantifier ("for some" property);

applying DeMorgan's laws includes converting the implicit existential quantifier ("for some" property) to an implicit universal quantifier ("for every" property) on the correlation operator $\Theta$; and resolving the correlation operator $\Theta$ includes verifying that all combinations of contextually related fields satisfy the sub-query that comprises the operand of the correlation operator $\Theta$.

5. A method according to claim 1 wherein:

the sub-query that comprises the operand of the correlation operator $\Theta$ includes at least one OR operator, and resolving the correlation operator $\Theta$ includes distributing the correlation operator $\Theta$ across the OR operator.

6. A method according to claim 1 wherein:

the sub-query that comprises the operand of the correlation operator $\Theta$ includes at least one AND operator;

resolving the correlation operator $\Theta$ includes flagging the AND operator as a correlating AND operator; and evaluating the query with the correlation operator $\Theta$ includes evaluating in the query with the correlation operator only combinations of fields that are contextually related.

7. A method according to claim 1 wherein:

the sub-query that comprises the operand of the correlation operator $\Theta$ includes at least one comparison operator;

resolving the correlation operator $\Theta$ includes flagging the comparison operator as a correlating comparison operator; and evaluating the query with the correlation operator $\Theta$ includes evaluating in the query with the correlation operator only combinations of fields that are contextually related.

8. A method according to claim 1 wherein resolving the correlation operator $\Theta$ includes:

distributing all AND operators across OR operators; and dividing the query into partial sets, wherein each partial set is a conjunction of one or more sub-queries.

9. A method according to claim 8 wherein resolving the correlation operator $\Theta$ further includes:

identifying within each partial set a highest-level AND operator that is flagged as a correlating AND operator; and separating each partial set into correlated sub-queries according to the highest-level AND operator that is flagged as a correlating AND operator.

10. A method according to claim 9 wherein:

identifying within each partial set a highest-level AND operator includes identifying within each partial set more than one highest-level AND operator that is flagged as a correlating AND operator; and separating each partial set into correlated sub-queries includes separating each partial set into correlated sub-queries according to each highest-level AND operator that is flagged as a correlating AND operator.

11. A method according to claim 1 wherein:

the sub-query comprising the operand for the correlation operator Θ includes matching field paths;

a database record includes multiple instances of the matching field paths; and evaluating the query with the correlation operator Θ includes determining that the database record with the multiple instances of the matching field paths satisfies the query with the correlation operator when the same instance of the matching field paths satisfies the query.

12. A method according to claim 1 wherein:

the sub-query comprising the operand for the correlation operator Θ includes non-matching field paths;

a database record includes multiple instances of the non-matching field paths, wherein each instance includes a parent field; and evaluating the query with the correlation operator Θ includes determining that the database record with the multiple instances of the non-matching field paths satisfies the query with the correlation operator when instances of the non-matching field paths satisfying the query have the same parent field.

13. A method according to claim 1 wherein:

the sub-query comprsing the operand for the correlation operator Θ includes matching field paths and non-matching field paths;

a database record includes multiple instances of the non-matching field paths, wherein each instance includes a parent field; and evaluating the query with the correlation operator Θ includes determining that the database record with the multiple instances of the non-matching field paths satisfies the query with the correlation operator when instances of the non-matching field paths satisfying the query have the same instance of the matching field paths as the parent field.

14. A method according to claim 1 further comprising rejecting the query if the operand for the correlation operator Θ cannot be correlated.

15. A method according to claim 1 wherein the correlation operator Θ is explicit in the query.

16. A method according to claim 15 wherein the explicit correlation operator Θ is inserted into the query by a user.

17. A method according to claim 1 wherein the correlation operator Θ is implicit in the query.

18. A method according to claim 1, wherein the correlation operator Θ is a unary operator.

19. A computer-readable medium containing a query engine for querying a database, the program comprising:

the database, wherein the database contains a plurality of records;

a query containing a correlation operator Θ and an operand for the correlation operator Θ, the correlation operator Θ achieving contextual relatedness by matching field paths; and the query engine including:

resolution software to resolve the correlation operator Θ across the operand for the correlation operator Θ;

transformation software to transform the resolved query into a disjunction of one or more partial sets; and evaluation software to separately evaluate each partial set against at least some database records and return a result that includes the union of the evaluation results for each partial set.

20. A computer-readable medium according to claim 19 wherein:

the correlation operator Θ includes an implicit existential quantifier ("for some" property); and the resolution software to resolve the correlation operator Θ includes search software to find a first combination of contextually related fields that satisfies the operand of the correlation operator Θ.

21. A computer-readable medium according to claim 19 wherein:

the correlation operator Θ, along with its operand, are in the scope of a NOT operator; and the resolution software to resolve the correlation operator Θ includes distribution software to distribute the NOT operator across any logical operators (AND, OR, NOT) within the sub-query that comprises the operand of the correlation operator Θ, using DeMorgan's laws.

22. A computer-readable medium according to claim 21 wherein:

the correlation operator Θ includes an implicit existential quantifier ("for some" property);

the distribution software that applies DeMorgan's laws includes conversion software to convert the implicit existential quantifier ("for some" property) to an implicit universal quantifier ("for every" property) on the correlation operator Θ; and the resolution software to resolve the correlation operator Θ includes verification software to verify that all combinations of contextually related fields satisfy the altered criteria in the sub-query that comprises the operand of the correlation operator Θ.

23. A computer-readable medium according to claim 19 wherein:

the sub-query that comprises the operand of the correlation operator Θ includes at least one OR operator; and the resolution software to resolve the correlation operator Θ includes distribution software to distribute the correlation operator Θ across the OR operator.

24. A computer-readable medium according to claim 19 wherein:

the sub-query that comprises the operand of the correlation operator Θ includes at least one AND operator;

the resolution software to resolve the correlation operator Θ includes flagging software to flag the AND operator as a correlating AND operator, and the evaluation software to separately evaluate each partial set includes evaluation software to evaluate in the query with the correlation AND operator only combinations of fields that are contextually related.

25. A computer-readable medium according to claim 19 wherein the transformation software to transform the resolved query includes:

identification software to identify at least one highest-level AND operator that is flagged as a correlating AND operator; and dividing software to divide the query with the correlation operator Θ into correlated sub-queries based on the at least one highest-level AND operator that is flagged as a correlating AND operator.

26. A computer-readable medium according to claim 25 wherein the dividing software to divide the query includes distribution software to distribute all AND operators over OR operators.

27. A computer-readable medium according to claim 26 wherein the distribution software to distribute all AND operators includes distribution software to distribute correlating AND operators.

28. A computer-readable medium according to claim 19 wherein the resolution software to resolve the correlation operator Θ includes rejection software to reject the query if the operand for the correlation operator Θ cannot be correlated.

29. A computer-readable medium according to claim 19 wherein the correlation operator Θ is explicit in the query.

30. A computer-readable medium according to claim 29 wherein the explicit correlation operator Θ is inserted into the query by a user.

31. A computer-readable medium according to claim 19 wherein the correlation operator Θ is implicit in the query.

32. A computer-readable medium according to claim 19, wherein the correlation operator Θ is a unary operator.

33. An apparatus for querying a database, the apparatus comprising:
the database, wherein the database is stored on a computer system and contains a plurality of records; and
a query containing a correlation operator Θ and an operand for the correlation operator Θ, the correlation operator Θ achieving contextual relatedness by matching field paths; and
a query engine including:
a resolution unit to resolve the correlation operator Θ across the operand for the correlation operator Θ;
a transformation unit to transform the resolved query into a disjunction of one or more partial sets; and
an evaluation unit to separately evaluate each partial set against at least some database records and return a result that includes the union of the evaluation results for each partial set.

34. An apparatus according to claim 33 wherein:
the correlation operator Θ includes an implicit existential quantifier ("for some" property); and
the resolution unit to resolve the correlation operator Θ includes a search unit to find a first combination of contextually related fields that satisfies the operand of the correlation operator Θ.

35. An apparatus according to claim 33 wherein:
the correlation operator Θ, along with its operand, are in the scope of a NOT operator; and
the resolution unit to resolve the correlation operator Θ includes a distribution unit to distribute the NOT operator across any logical operators (AND, OR, NOT) within the sub-query that comprises the operand of the correlation operator Θ, using DeMorgan's laws.

36. An apparatus according to claim 33 wherein:
the correlation operator Θ includes an implicit existential quantifier ("for some" property);
the distribution unit that applies DeMorgan's laws includes a conversion unit to convert the implicit existential quantifier ("for some" property) to an implicit universal quantifier ("for every" property) on the correlation operator Θ; and
the resolution unit resolving the correlation operator Θ includes a verification unit to verify that all combinations of contextually related fields satisfy the altered criteria in the sub-query that comprises the operand of the correlation operator Θ.

37. An apparatus according to claim 33 wherein:
a sub-query that comprises the operand of the correlation operator Θ includes at least one OR operator; and
the resolution unit to resolve the correlation operator Θ includes a distribution unit to distribute the correlation operator Θ across the OR operator.

38. An apparatus according to claim 33 wherein:
a sub-query that comprises the operand of the correlation operator Θ includes at least one AND operator; and
the resolution unit to resolve the correlation operator Θ includes a flagging unit to flag the AND operator as a correlating AND operator; and
the evaluation unit to separately evaluate each partial set includes an evaluation unit to evaluate in the query with the correlating AND operator only combinations of fields that are contextually related.

39. An apparatus according to claim 33 wherein the transformation unit to transform the resolved query includes:
an identification unit to identify at least one highest-level AND operator that is flagged as a correlating AND operator; and
a division unit to divide the query with the correlation operator Θ into correlated sub-queries based on the at least one highest-level AND operator that is flagged as a correlating AND operator.

40. An apparatus according to claim 39 wherein the division unit to divide the query includes a distribution unit to distribute all AND operators over OR operators.

41. An apparatus according to claim 40 wherein the distribution unit to distribute all AND operators includes a distribution unit to distribute correlating AND operators.

42. An apparatus according to claim 33 wherein the resolution unit to resolve the correlation operator Θ includes a rejection unit to reject the query if the operand for the correlation operator Θ cannot be correlated.

43. An apparatus according to claim 33 wherein the correlation operator Θ is explicit in the query.

44. An apparatus according to claim 43 wherein the explicit correlation operator Θ is inserted into the query by a user.

45. An apparatus according to claim 33 wherein the correlation operator Θ is implicit in the query.

46. An apparatus according to claim 33, wherein the correlation operator Θ is a unary operator.

47. A method of querying arbitrarily structured records in a database, the method being implemented in a query engine, the query engine being executable by a processor operably connected to a memory device, and the method comprising the following steps executed in an order and repetition determined by the query engine:
building, in a memory device, a query structure containing a selection criterion and information defining a query, the query structure containing a correlation operator Θ limiting the selection criterion to correlated information satisfying the correlation operator Θ, the correlation operator Θ achieving contextual relatedness by matching field paths;
retrieving indicia of records from the database in accordance with the query structure;
evaluating each of the indicia according to the selection criterion to determine whether the indicia satisfy the selection criterion and the correlation operator Θ; and returning selected indicia that satisfy the selection criterion and the correlation operator $\Theta$.

48. A memory device storing data structures containing executables, and data associated therewith, the executables being effective to be executed by a processor operably connected to the memory device, the data structures comprising:

arbitrarily structured records stored in the memory device;

a query structure stored in the memory device and representing a selection criterion, the query structure containing a correlation operator $\Theta$ limiting the selection criterion to correlated information satisfying the correlation operator $\Theta$, the correlation operator $\Theta$ achieving contextual relatedness by matching field paths; and a query engine data structure stored in the memory device to be executable by the processor to build the query structure and to retrieve indicia of records satisfying the query.

* * * * *

UNITED STATES PATENT AND TRADEMARK OFFICE
CERTIFICATE OF CORRECTION

PATENT NO. : 6,560,595 B1
DATED : May 6, 2003
INVENTOR(S) : Sanders et al.

It is certified that error appears in the above-identified patent and that said Letters Patent is hereby corrected as shown below:

Drawings,
Please insert revised FIGS. 1 and 4 attached herewith.

Column 10,
Line 37, missing sentence or phrase, should read -- for example, becomes for all intents and purposes, --.

Column 13,
Line 9, missing number, "Separate each" should read -- 5. Separate each --.

Signed and Sealed this

Twentieth Day of January, 2004

JON W. DUDAS
*Acting Director of the United States Patent and Trademark Office*